United States Patent
Julich et al.

(10) Patent No.: US 7,512,481 B2
(45) Date of Patent: Mar. 31, 2009

(54) SYSTEM AND METHOD FOR COMPUTER AIDED DISPATCHING USING A COORDINATING AGENT

(75) Inventors: Paul M. Julich, Indialantic, FL (US); Mitchell Scott Wills, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 669 days.

(21) Appl. No.: 10/785,057

(22) Filed: Feb. 25, 2004

(65) Prior Publication Data
US 2004/0172174 A1   Sep. 2, 2004

Related U.S. Application Data

(60) Provisional application No. 60/449,849, filed on Feb. 27, 2003.

(51) Int. Cl.
*G06F 19/00* (2006.01)
*G01C 21/00* (2006.01)
*G06G 7/76* (2006.01)
*G05D 3/00* (2006.01)

(52) U.S. Cl. .................. 701/117; 701/19; 701/202; 701/301

(58) Field of Classification Search .............. 246/2 R, 246/20, 21, 2 S, 14; 703/8; 701/300, 117, 701/301, 302, 204, 118, 202, 209, 19; 340/906; 705/1
See application file for complete search history.

(56) References Cited

U.S. PATENT DOCUMENTS

| | | | |
|---|---|---|---|
| 3,575,594 | A | 4/1971 | Elcan |
| 3,734,433 | A | 5/1973 | Metzner |
| 3,794,834 | A | 2/1974 | Auer, Jr. et al. |
| 3,839,964 | A | 10/1974 | Gayot |
| 3,895,584 | A | 7/1975 | Paddison |
| 3,944,986 | A | 3/1976 | Staples |
| 4,099,707 | A | 7/1978 | Anderson |
| 4,122,523 | A | 10/1978 | Morse et al. |
| 4,361,300 | A | 11/1982 | Rush |
| 4,361,301 | A | 11/1982 | Rush |
| 4,610,206 | A | 9/1986 | Kubala et al. |
| 4,669,047 | A | 5/1987 | Chucta |

(Continued)

FOREIGN PATENT DOCUMENTS

CA   2057039   12/1990

(Continued)

OTHER PUBLICATIONS

Crone, et al., "Distributed Intelligent Network Management for the SDI Ground Network," IEEE, 1991, pp. 722-726, MILCOM '91.

(Continued)

*Primary Examiner*—Thomas G Black
*Assistant Examiner*—Christine M Behncke
(74) *Attorney, Agent, or Firm*—Duane Morris LLP (57) ABSTRACT

A system and method for controlling the movement of plural trains over a rail network, where the rail network is divided into a plurality of planning areas with a boundary element of common track between adjacent planning areas, using a local coordinating agent for controlling the movement of the trains through the boundary elements.

13 Claims, 7 Drawing Sheets

U.S. PATENT DOCUMENTS

| | | | |
|---|---|---|---|
| 4,791,871 A | 12/1988 | Mowll | |
| 4,843,575 A | 6/1989 | Crane | |
| 4,883,245 A | 11/1989 | Erickson, Jr. | |
| 4,926,343 A | 5/1990 | Tsuruta et al. | |
| 4,937,743 A | 6/1990 | Rassman et al. | |
| 5,038,290 A | 8/1991 | Minami | |
| 5,063,506 A | 11/1991 | Brockwell et al. | |
| 5,177,684 A | 1/1993 | Harker et al. | |
| 5,222,192 A | 6/1993 | Shafer | |
| 5,229,948 A | 7/1993 | Wei et al. | |
| 5,237,497 A | 8/1993 | Sitarski | |
| 5,265,006 A | 11/1993 | Asthana et al. | |
| 5,289,563 A | 2/1994 | Nomoto et al. | |
| 5,311,438 A | 5/1994 | Sellers et al. | |
| 5,331,545 A | 7/1994 | Yajima et al. | |
| 5,332,180 A | 7/1994 | Peterson et al. | |
| 5,335,180 A | 8/1994 | Takahashi et al. | |
| 5,365,516 A | 11/1994 | Jandrell | |
| 5,390,880 A | 2/1995 | Fukawa et al. | |
| 5,420,883 A | 5/1995 | Swensen et al. | |
| 5,437,422 A | 8/1995 | Newman | |
| 5,463,552 A | 10/1995 | Wilson et al. | |
| 5,467,268 A | 11/1995 | Sisley et al. | |
| 5,487,516 A | 1/1996 | Murata et al. | |
| 5,541,848 A | 7/1996 | McCormack et al. | |
| 5,623,413 A | 4/1997 | Matheson et al. | |
| 5,745,735 A | 4/1998 | Cohn et al. | |
| 5,794,172 A | 8/1998 | Matheson et al. | |
| 5,801,943 A * | 9/1998 | Nasburg | 701/117 |
| 5,823,481 A * | 10/1998 | Gottschlich | 246/28 R |
| 5,825,660 A | 10/1998 | Cagan et al. | |
| 5,828,979 A | 10/1998 | Polivka et al. | |
| 5,836,529 A * | 11/1998 | Gibbs | 246/122 R |
| 5,850,617 A | 12/1998 | Libby | |
| 6,032,905 A | 3/2000 | Haynie | |
| 6,115,700 A | 9/2000 | Ferkinhoff et al. | |
| 6,125,311 A | 9/2000 | Lo | |
| 6,144,901 A | 11/2000 | Nickles et al. | |
| 6,154,735 A * | 11/2000 | Crone | 706/45 |
| 6,250,590 B1 | 6/2001 | Hofestadt et al. | |
| 6,351,697 B1 | 2/2002 | Baker | |
| 6,377,877 B1 | 4/2002 | Doner | |
| 6,393,362 B1 | 5/2002 | Burns | |
| 6,405,186 B1 | 6/2002 | Fabre et al. | |
| 6,459,964 B1 * | 10/2002 | Vu et al. | 701/19 |
| 6,459,965 B1 | 10/2002 | Polivka et al. | |
| 6,587,764 B2 | 7/2003 | Nickles et al. | |
| 6,637,703 B2 | 10/2003 | Matheson et al. | |
| 6,654,682 B2 | 11/2003 | Kane et al. | |
| 6,766,228 B2 | 7/2004 | Chirescu | |
| 6,789,005 B2 | 9/2004 | Hawthorne | |
| 6,799,097 B2 | 9/2004 | Antelo et al. | |
| 6,799,100 B2 | 9/2004 | Burns | |
| 6,853,889 B2 | 2/2005 | Cole | |
| 6,856,865 B2 | 2/2005 | Hawthorne | |
| 6,873,962 B1 * | 3/2005 | Doner | 705/7 |
| 7,006,796 B1 | 2/2006 | Hofmann et al. | |
| 7,200,471 B2 * | 4/2007 | Kane et al. | 701/19 |
| 7,386,391 B2 * | 6/2008 | Morariu et al. | 701/117 |
| 2003/0060966 A1 * | 3/2003 | MacPhail et al. | 701/117 |
| 2003/0105561 A1 | 6/2003 | Nickles et al. | |
| 2003/0183729 A1 | 10/2003 | Root et al. | |
| 2004/0010432 A1 | 1/2004 | Matheson et al. | |
| 2004/0034556 A1 | 2/2004 | Matheson et al. | |
| 2004/0093196 A1 | 5/2004 | Hawthorne | |
| 2004/0093245 A1 | 5/2004 | Matheson et al. | |
| 2004/0267415 A1 | 12/2004 | Lacote et al. | |
| 2005/0107890 A1 | 5/2005 | Minkowitz et al. | |
| 2005/0192720 A1 | 9/2005 | Christie et al. | |
| 2006/0074544 A1 * | 4/2006 | Morariu et al. | 701/117 |

FOREIGN PATENT DOCUMENTS

| | | |
|---|---|---|
| CA | 2066739 | 2/1992 |
| CA | 2046984 | 6/1992 |
| CA | 2112302 | 6/1994 |
| CA | 2158355 | 10/1994 |
| EP | 0108363 | 5/1984 |
| EP | 0193207 | 9/1986 |
| EP | 0341826 | 11/1989 |
| EP | 0554983 | 8/1993 |
| FR | 2692542 | 12/1993 |
| GB | 1321053 | 6/1973 |
| GB | 1321054 | 6/1973 |
| JP | 3213459 | 9/1991 |
| WO | WO 90/03622 | 4/1990 |
| WO | WO 93/15946 | 8/1993 |

OTHER PUBLICATIONS

Ghedira, "Distributed Simulated Re-Annealing for Dynamic Constraint Satisfaction Problems," IEEE 1994, pp. 601-607.

Hasselfield, et al., "An Automated Method for Least Cost Distribution Planning," IEEE Transactions on Power Delivery, vol. 5, No. 2, Apr. 1990, 1188-1194.

Herault, et al., "Figure-Ground Discrimination: A Combinatorial Optimization Approach," IEEE Transactions on Pattern Analysis & Machine Intelligence, vol. 15, No. 9, Sep. 1993, 899-914.

Igarashi, "An Estimation of Parameters in an Energy Fen Used in a Simulated Annealing Method," IEEE, 1992, pp. IV-180-IV-485.

Komaya, "A New Simulation Method and its Application to Knowledge-based Systems for Railway Scheduling," May 1991, pp. 59-66.

Puget, "Object Oriented Constraint Programming for Transportation Problems," IEEE 1993, pp. 1-13.

Sasaki, et al., "Development for a New Electronic Blocking System," QR of RTRI, vol. 30, No. 4, Nov. 1989, pp. 198-201.

Scherer, et al., "Combinatorial Optimization for Spacecraft Scheduling," 1992 IEEE International Conference on Tolls with AI, Nov. 1992, pp. 120-126.

Watanabe, et al., "Moving Block System with Continuous Train Detection Utilizing Train Shunting Impedance of Track Circuit," QR of RTRI, vol. 30, No. 4, Nov. 1989, pp. 190-197.

* cited by examiner

SYSTEM AND METHOD FOR COMPUTER AIDED DISPATCHING USING A COORDINATING AGENT

This application claims the benefit of U.S. Provisional Application 60/449,849 filed on Feb. 27, 2003, and is related to commonly owned patent application titled "System and Method for Dispatching by Exception", filed on even date, herewith, both of which are incorporated by reference.

BACKGROUND

The development of a train schedule for a global rail network, i.e., nationwide, is difficult on a real time basis due to the complexity of the problem of controlling many trains competing for limited resources simultaneously. Rail networks typically contain tens of thousands of miles of track, thousands of locomotives and hundreds of thousands of freight cars. At any one moment, thousands of trains and maintenance vehicles may be competing for a limited amount of track. To manage consistent scheduled service in this environment, railroads use the "divide and conquer" technique to partition the railroad network into several control territories and generate a local movement plan for each control territory to thereby distribute the complexity of the scheduling problem over many scheduling resources. Human train dispatchers are assigned to these control territories, and have the responsibility to smoothly transit trains and equipment across the control territory, with minimum delay in accordance with the corresponding movement plan for the control territory. Multiple dispatchers, each controlling a predefined portion of the railroad, comprise the paradigm for modern day computer-based railroad dispatching systems.

In this environment, the dispatcher is expected to solve complex movement problems in real time. For example, dispatchers must consider the limited track resources, length of trains, length of available sidings, train meet and pass points, maintenance requests for track time, engine availability, etc. Dispatching can become a stressful environment, and while safeguards are in place with signaling systems in the field, dispatcher mistakes could cost lives and frequently results in significant decreases in performance for the railroad To ease the burden, computer processing scheduling systems are used to help dispatchers "see" their control area, and external systems provide a constant flow of information about the state of the railroad. This information flow includes train schedules, customer commitments, maintenance schedules, train consists, track outages, crew information, weather and other dynamic factors that directly affect the daily operations of the railroad. As more systems are computerized, dispatchers receive more accurate information, however; the volume of information is growing at a rate that makes it increasingly difficult to formulate decisions and actions in real time. Because of information overload, and the decision structures of typical dispatch systems, dispatchers lack insight into effects of their actions on the entire route of the train, or the effects to the railroad as a whole. Several train dispatchers will "touch" a train as it traverses its route across the railroad network. With limited information and a predefined decision structure, it is inevitable that one dispatcher's action, while appropriate within the context of the dispatcher's territory, results in large financial losses for the railroad.

Without full comprehension of the complex adjacent territories or the relative value of a train to the railroad at any one particular instant, the dispatcher is ill equipped to make optimum dispatch decisions, even within their control own territory. As such, a dispatcher may route a train into an adjacent territory, only to discover that by doing so, the end result is more congestion for the overall railroad. In this instance the correct decision would have been to hold the train within the dispatcher's territory at an available siding or yard with ample capacity, and wait until the congestion reduces or clears. Another situation in which the dispatcher lacks adequate information about the global network to make the most optimal decision may occur where several trains need to pass through a congested track area, and there is not enough available track to accommodate all simultaneously. The dispatcher has to quickly decide which trains to "side" (place in an available siding) in order to let other trains pass. In today's dispatching environments, there is insufficient information about a train in context with all other trains in other control territories in order for the dispatcher to make the best decision for the railroad as a whole, due to the lack of coordination of the movement of trains from one control territory to an adjacent control territory.

The present application is directed to a system and method of scheduling and controlling the movement of trains over a large rail network. According to one aspect of the invention, the rail network is divided into a plurality of planning areas as a function of the shared resources between each adjacent planning area.

According to another aspect of the present invention, a local movement plan for each planning area develops a local movement plan independently of the movement plan developed for other planning areas to control the movement of trains into and out of the shared resources associated with the adjacent planning areas.

According to yet another aspect of the present invention, each of the local movement plans is evaluated to identify conflicts at the shared resources between adjacent planning areas.

According to still another aspect of the present invention, the local movement plans are modified to resolve the identified conflicts at the boundary elements.

The advantages of the present invention will be readily apparent to one skilled in the art to which it pertains from a perusal of the claims, the appended drawings, and the following detailed description.

DETAILED DESCRIPTION

The coordination of the movement of trains from one control territory to another is important to the development of an achievable global movement plan. However, the selection of boundaries of prior art of control territories contributes to the problems identified above. Instead, if the boundaries of a planning areas were selected as a function of the track characteristics and the movement of trains through the shared resources were carefully controlled, the complexity of the train movement scheduling and the attendant problems identified above would be greatly reduced.

Figure 1:
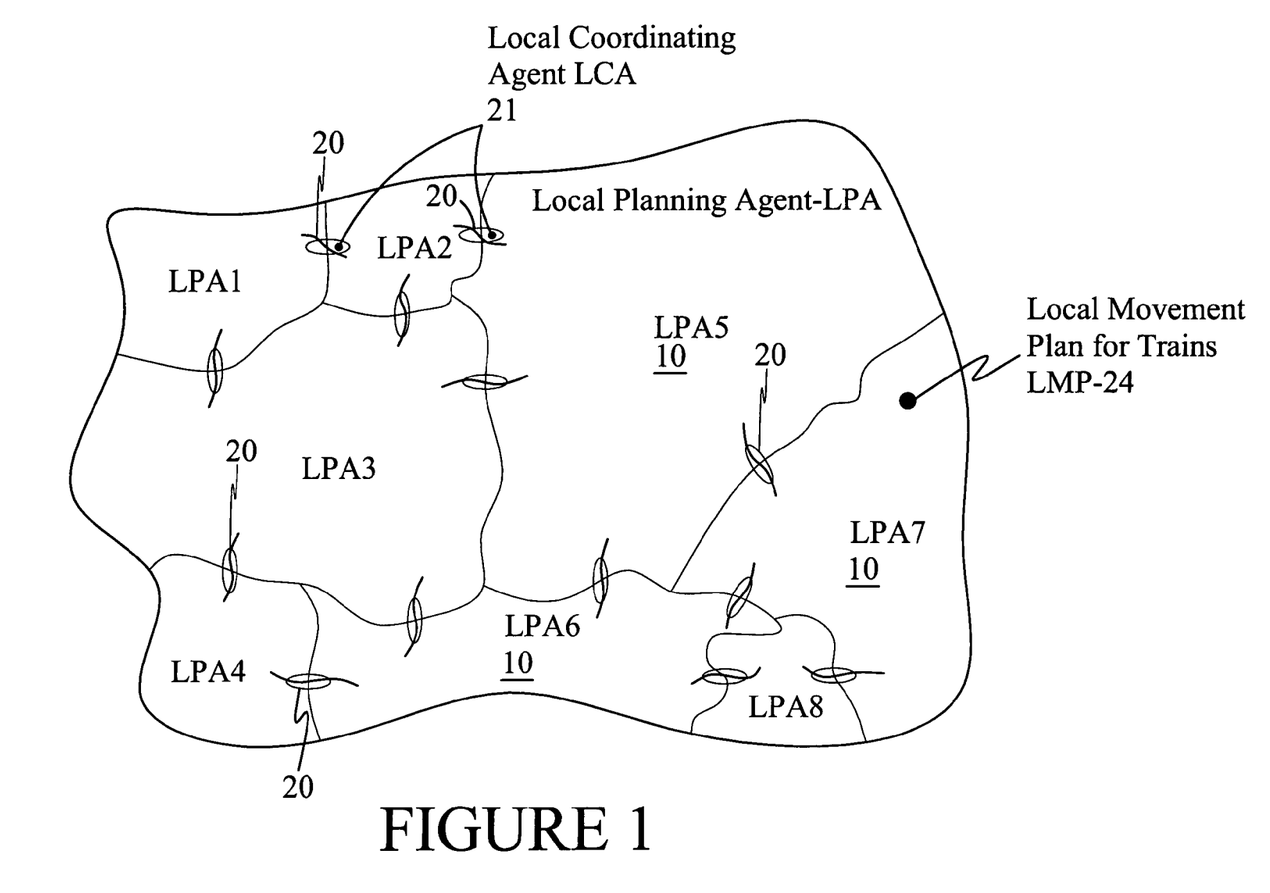
FIG. 1 is a simplified pictorial representation of a rail network divided into plural planning areas in accordance with one embodiment of the present invention.

FIG. 1 illustrates how a global rail network can be partitioned into a plurality of planning areas 10 where each planning area shares at least one resource, known as a boundary element 20, in accordance with one embodiment of the present invention. The boundary elements are selected as a function of the configuration of the track elements 22 which are common to adjacent planning areas and takes into account suitable factors, such as the miles of track, track complexity and anticipated traffic in the planning area. Thus the boundaries of the local planning areas are defined by the selection of boundary elements 20, which may result in an irregular shape of the planning areas. A real-time solution to the scheduling problem can be achieved by closely controlling the passage of the trains through the boundary elements, while allowing the dispatcher to otherwise control the movement of the trains under his responsibility in his planning area which is configured independently of the boundary elements.

Figure 2:
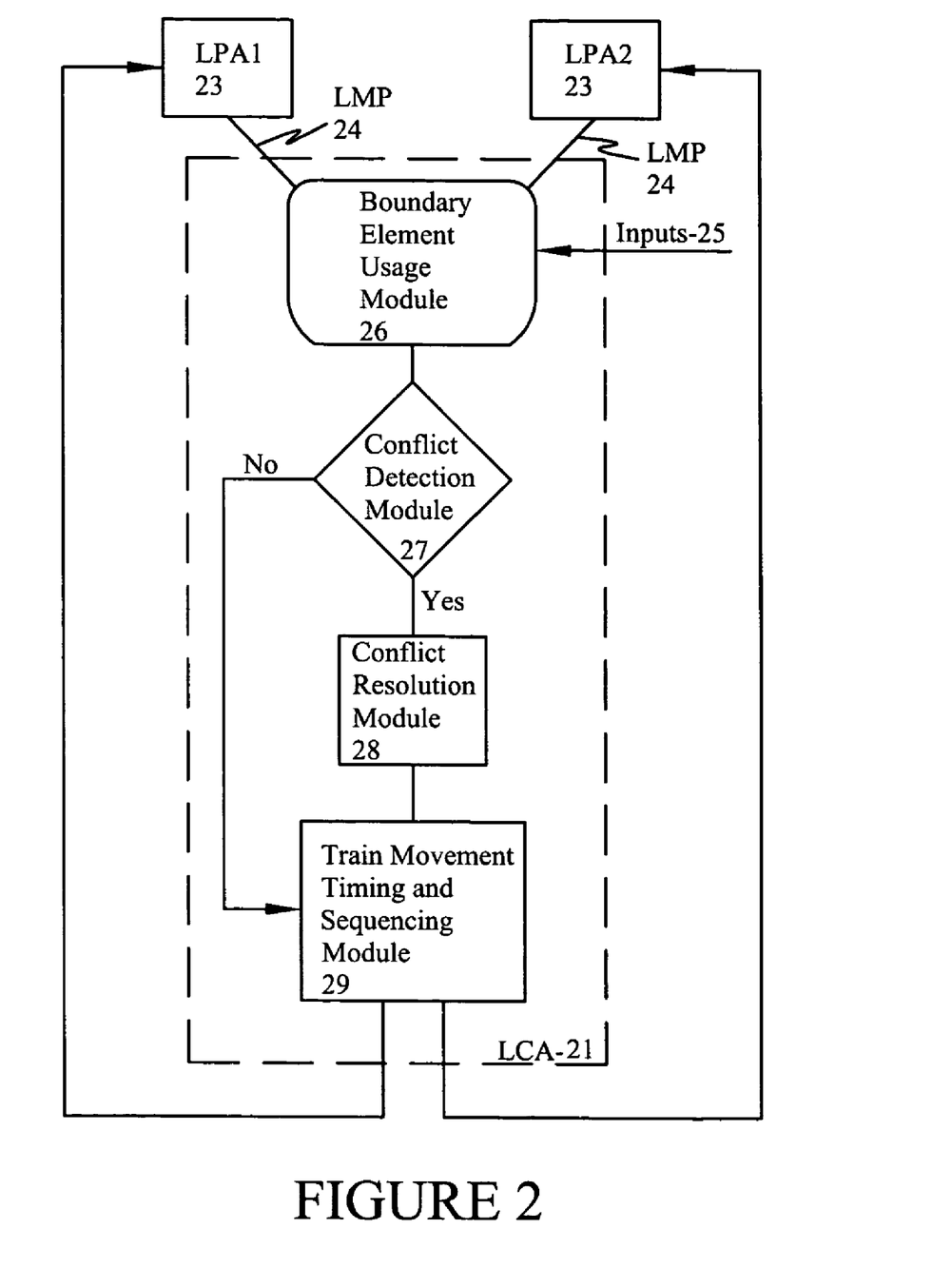
FIG. 2 is a simplified functional block diagram illustrating the interaction between a local coordinating agent (LCA) and adjacent local planning agents (LPSs) for use with the embodiment of FIG. 1.

In one aspect of the present invention, a computer processor based Local Planning Agent ("LPA" also designated at 23) is assigned to each planning area. The LPA generates a local movement plan ("LMP") to control the movement of the trains in the corresponding local planning area. Each LPA operates independently and asynchronously from all other LPAs. Adjacent LPAs provide their respective LMPs to a computer processor based local coordinating agent ("LCA" also designated at 21). The LCA 21 has the responsibility for managing the movement order constraints for the boundary element 20, i.e., the order (sequence) of the trains and the ranges of times of arrival and departure for the trains through the boundary element. While the LPA 23 controls the movement of trains in its respective local planning area, the LPA 23 is constrained to maintain the order of arrival and departure of trains through a boundary element 20 that is determined by the LCA 21. As described below, each LCA 21 includes a boundary element usage module 26, a conflict detection module 27, a conflict resolution module 28 and a train movement timing and sequencing module 29. The modules may be a computer readable program code embodied in a computer usable medium for use with a general purpose computer.

FIG. 2 illustrates the relationship between a LCA 21 for boundary element 20, and the local planning agents 23 for adjacent planning areas 10. Each LPA 23 independently and asynchronously generates a LMP 24 and sends its LMP to the LCA 21 for the respective boundary element 20 for review. For each train in the LMP 24, the LPA provides information on the status of the trains planned movement through the boundary element. While the train is a long time from arriving at the boundary, the status is marked 'Planned'. As a train approaches the boundary (<8 hours away) the status changes to 'Resolved' (a firm plan is in place), or 'Unresolved' (the trains plan is not firm because a conflict with another train within the LPA has not been resolved). As a train nears the boundary element, typically 30-60 minutes away, the movement plan across the boundary will be marked as 'Committed', meaning that the LPA may not make any further adjustments to the plan. As the train approaches the boundary element control signals are cleared or track warrants issued by the traffic control system and the train is marked 'Authority Issued'. Once track authority is issued to a train neither the LPA's or the LCA's can change the plan for the trains movement. The LCA 21 reviews each LMP and identifies planned usage of the boundary element at the boundary element usage 26 and the status of the trains planned movement as discussed above. If a conflict between the usage of the boundary element is detected at the conflict detection module 27 (e.g., overbooking of the trains set to pass through the boundary element), the LCA 21 resolves any conflict in the LMPs for the LPA 23 in the conflict resolution module 28. The conflict resolution module 28 considers the boundary element availability (movement may be restricted during certain periods for track maintenance, etc.), train arrival times, train dwell time (trains may have scheduled work on the boundary elements), and the cost of delaying a train (based upon a cost function keyed to the trains arrival at a predefined waypoint). In addition, the LCA considers a congestion metric supplied by the LPA's to provide backpressure in the event that congestion is building up within one of the planning areas. The conflict resolution module defines the train sequence for moves at the boundary elements 20, and provides the train movement timing and sequencing module 29 updated estimated times of train arrival, dwell time and sequence that are passed to each of the adjacent LPAs 23 in order to update their respective LMPs. The respective LPAs 23 use these inputs in their next planning cycle. The result of the process is that conflicts in plans at the boundary become smaller as a train moves toward the boundary element and by the time it is 'committed' the conflicts have been resolved and the LMPs will agree at the boundary element.

Because each boundary element appears in two LPAs, the trains that will operate in both LPAs must be coordinated at the boundary element 20. For any given update to a LMP by one LPA, the occupancy times (entry and exit) of a train in the boundary element used for a common track 22 may not necessarily coincide with the boundary element occupancy times of the same train set by the LMP of the adjacent LPA 23, because each LPA operates independently and asynchronously with respect to the other LPAs. Thus, it is necessary for the LCA 21 to coordinate the boundary element usage by both trains in order to compile a correct estimate of the boundary element usage. For each boundary element, the respective LCA will compare the boundary element usage of a newly generated LMP from one LPA with the existing LMP of the adjacent LPA. If the boundary element is overbooked, the LCA 21 will generate a schedule of resource usage that removes the overbooking and provides appropriate constraining inputs to the cognizant LPA. The cognizant LPA use these constraints in its next plan generation cycle. In addition, a LCA 21 will specify the ordering of trains through a boundary element. The LPAs will honor this ordering in the next plan generation cycle.

Inputs 25 to the LCA 21 may include business objective functions for each of the trains, the capacity of the boundary element, and constraints on occupancy times. The business objective function for each train is used to evaluate the incremental cost of delaying each train. Evaluating the incremental cost at the boundary element allows the LCA to compare the value of alternatives in assigning the trains to available time intervals at the boundary element.

The capacity of a boundary element is the number of trains that can be present at the boundary element at any instant of time. If the boundary element is a single segment of track (one signal block) then the capacity is one. In some areas, however, longer or more complex track may allow more than one train into a boundary element at the same time. The planned usage of the shared boundary element is the sum of the scheduled usage of the boundary element by each of the LPAs. This usage is derived from the LMPs for each of the trains planned through the boundary element within the planning horizon.

Train occupancy constraints identify a train occupancy that must be honored by the LCA. This constraint allows a user to select and "freeze" the occupancy time for a train or a LMP to be frozen because track authorities have already been issued to the train. It also provides a means for specifying temporary reduction of boundary element capacity because of maintenance of work (MOW) or other constraints. Mutually exclusive constraints specified in a LMP will result in a planning exception that must be resolved by dispatcher action.

Based on a consideration of each of the inputs, a LCA will output movement order constraints and the sequence in which trains will move through the boundary element. The LCA provides movement order constraints specifying the availability of a boundary element for each of the cognizant LPAs. This availability restricts a LPA from utilizing a boundary element during a time interval that has been reserved for its adjacent LPA. Constraints are implemented by specifying the ETA and dwell time (i.e., the time a given resource is in use and not available) at the boundary element for trains from the adjacent planning area. Each reservation period may include a cushion to reduce the impact of small arrival time fluctuations.

The train sequence outputted by the LCA provides an ordering for trains to move through a boundary element. The LPAs honor this ordering. Train sequence is not binding on the next replan by the LCA, unless the associated plan status is 'authority issued'.

The local planning areas do not have to correspond with the prior art control territories associated with a human dispatcher. The planning areas can encompass several control territories under the control of individual dispatchers; each dispatcher having responsibility for execution of a portion of the LMP. Boundary elements may occur at locations where the track is controlled or not controlled. Uncontrolled track is track that is not controlled by the dispatcher, such as a terminal, which is under the control of a separate entity. If the boundary element includes uncontrolled track, the LPA s represent the boundary element as a finite capacity queue for planning purposes.

If the boundary element is controlled track, then a queue will not usually be used to represent the constraint by the LPA. Controlled boundary elements are represented by their detailed track structure. For each train passing through the controlled boundary element, the supplying LPA will determine the track segment that the train will utilize and indicate the time that the train will pass through the boundary element. After resolving the conflicts for the boundary, the LCA will specify the precedence relative to other trains utilizing the same track element. In order to resolve the conflicts, the LCA may delay a train's arrival at the boundary, but may never advance the time of arrival from that forecast by the LPA in the LMP.

Boundary elements require special consideration because of the independent nature of the planning processes. An LPA attempts to optimize the movement of trains within its area of concern. This process will, if unchecked, attempt to push trains through a planning area without regard to the problems caused in an adjacent planning areas or at the boundary element between planning areas. Boundary congestion problems are addressed by the LPAs by placing limits on the flow of traffic into a boundary element. The limiting mechanism is the finite capacity of the boundary element. Restricting the flow across the boundary element provides a control mechanism that may be used to reduce the buildup of congestion in a neighboring area.

In another aspect of the present invention boundary elements between planning areas are chosen so as to minimize the interaction between LPAs. For example, the boundary element can be chosen as a terminal, which may be composed of multiple yards represented by a finite capacity queue. Using a terminal at the boundary point facilitates the hand-off between adjacent planning areas because it provides buffer space to hold a train at the boundary element between the asynchronously scheduled planning areas.

Figure 3:
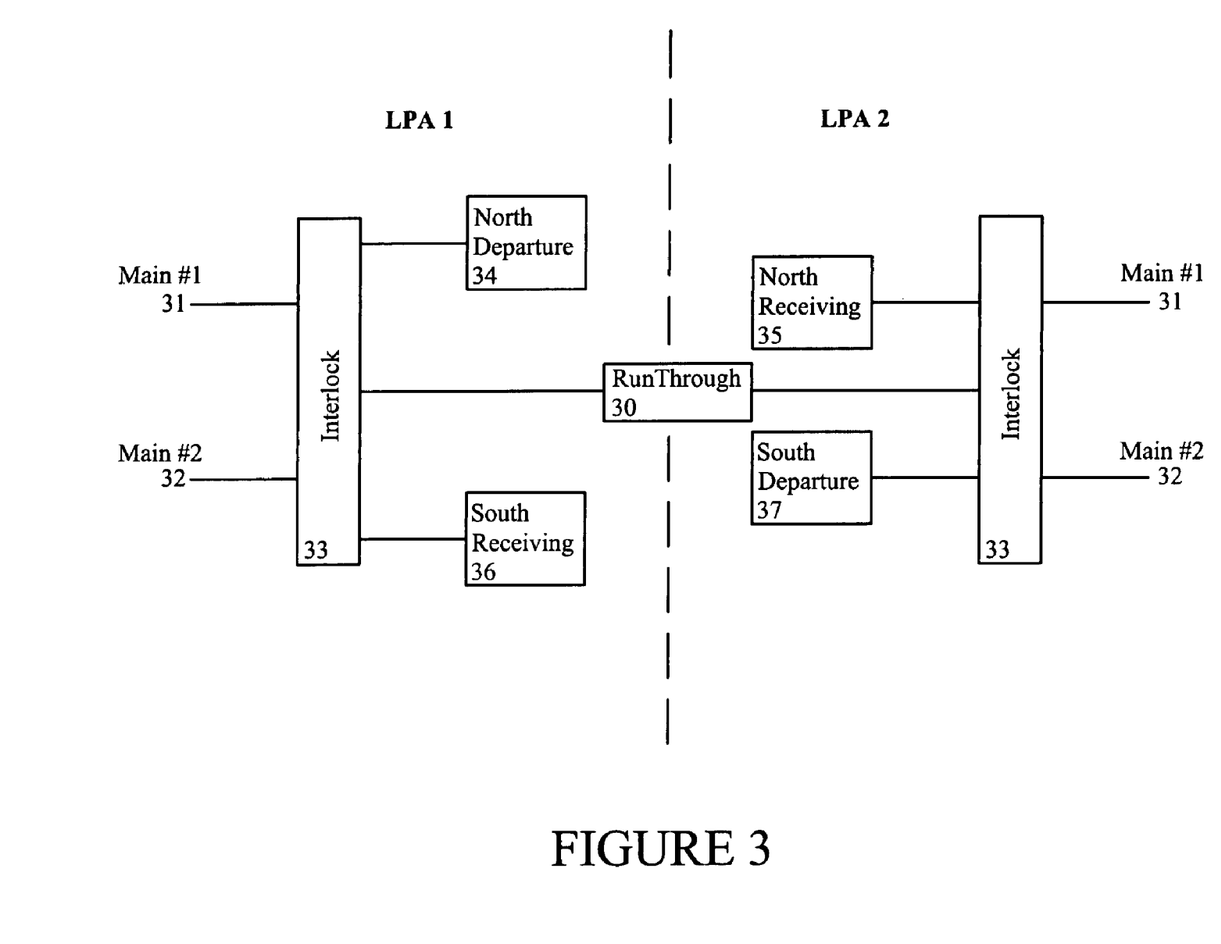
FIG. 3 is a simplified pictorial representation of a boundary element in accordance with one embodiment of the present invention.

FIG. 3 illustrates an example of the application of one embodiment of the invention where a terminal has been selected as a boundary element. LPA 1 plans the movement of trains into a suitable LPA 1 receiving yard referred to as a South receiving yard 36 and accepts trains from a suitable LPA 1 departure yard referred to as a North departure yard 34 through a suitable train interlock switch 33. South receiving yard 36 and North departure yard 34 are not visible for planning purposes to LPA 2. LPA 2 plans the movement of trains into a suitable LPA 2 receiving yard referred to as a North receiving yard 35 and accepts trains from a suitable LPA 2 receiving yard referred to as a South departure yard 37 thorough a suitable train interlock switch 33. North receiving yard 35 and South departure yard 37 are not visible for planning purposes to LPA 1. The run thru queue 30 for the terminal is a boundary element and is visible to both planning agents as are main lines #1 and #2 at 31 and 32 respectively. The boundary element 30 may be represented as two one way queues or a bi-directional queue. If the boundary element 30 is represented as two finite capacity queues (each with a specified direction of movement), then each LPA agent would plan trains to move into one of the queues and accept trains from the other queue. If, on the other hand, a bi-directional queue is specified, then either planning agent may move trains into or accept trains from the queue. Because both planning agents are attempting to move trains into the same queue, a conflict situation may develop that must be resolved by an LCA.

Boundary element queues for uncontrolled track have a finite capacity that may vary with time. The capacity of a boundary queue must be allocated among two adjacent LPAs for a planning interval. There are conceptually three means of allocating the capacity, (a) fixed allocation, (b) time dependent allocation, and (c) dynamic allocation.

For fixed allocation, the capacity of the queue for the boundary element is allocated according to a fixed ratio that is constant. For example, a queue with capacity of 4 might have capacity of 2 allocated to each of the LPAs.

For time dependent allocation, significant traffic variations may be managed by allocating the boundary element queue capacity according to a function of time. For example, if a peak in a first direction (such as westbound traffic) occurs in the morning hours and a peak in the opposed direction (such as eastbound traffic) occurs in the evening hours, then the boundary element could allocate the capacity to match the traffic peaks. For example the allocation of queue capacity could be allocated to provide a capacity of 3 westbound and 1 eastbound in the morning and 3 eastbound and 1 westbound in the evening.

With respect to dynamic allocation, maximum utilization of the boundary queues may be obtained by dynamically allocating the capacity in accordance with the current traffic levels. In this case, a LCA would automatically manage the allocation of the boundary queue capacity based upon the projected need for the queue by each of the LPAs. Fixed and dynamic allocation schemes require the least intervention by users. In many situations, variations in traffic make the dynamic allocation scheme attractive. The dynamic allocation approach requires a LCA to perform the allocation of the boundary capacity among the LPAs.

Figure 4:
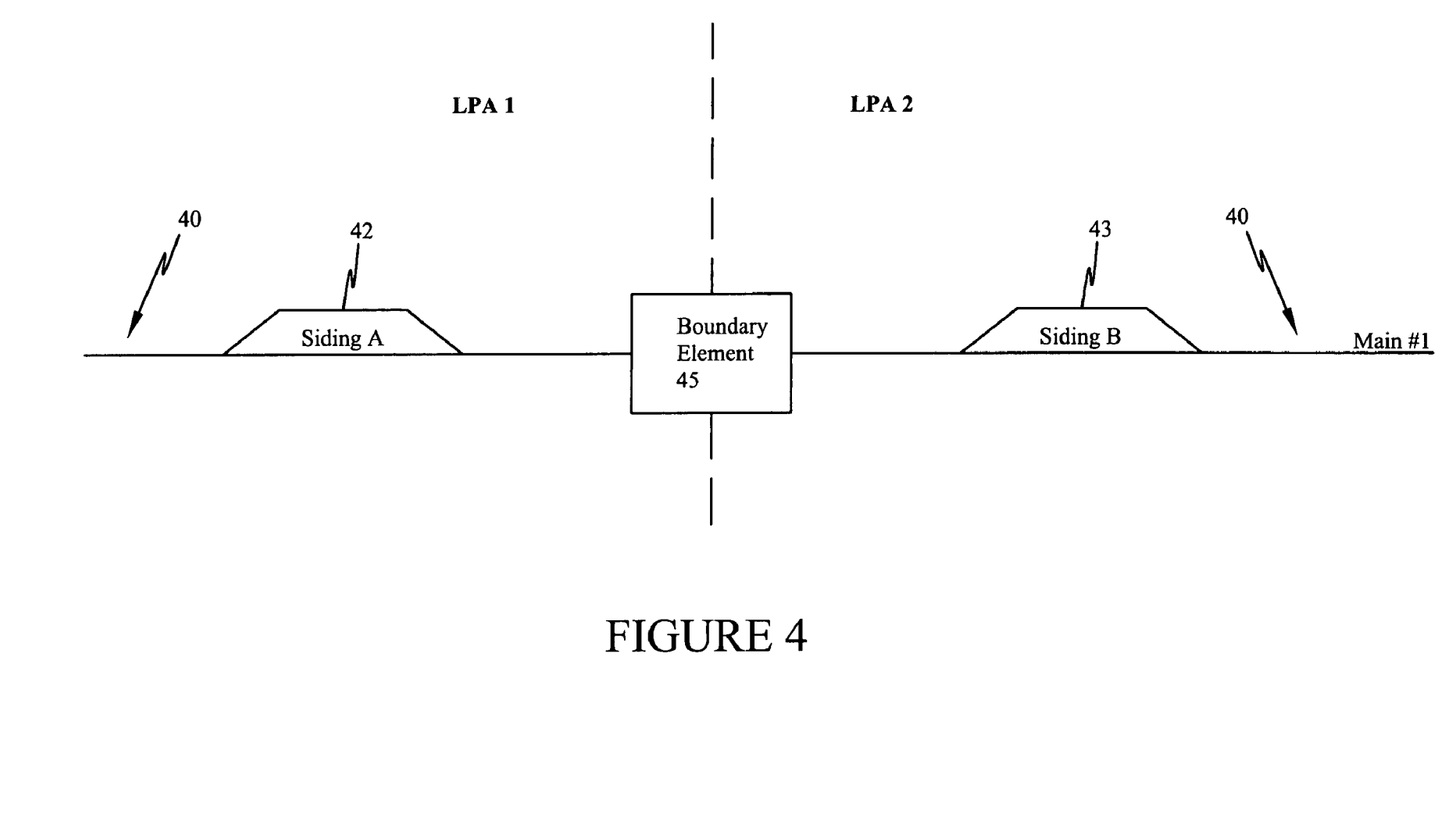
FIG. 4 is a simplified pictorial representation of a boundary element in accordance with another embodiment of the present invention.

If the boundary element is controlled track then it is advantageous to simplify the decision process at the boundary. FIG. 4 is an example of one embodiment of the present invention in which the boundary element is a single controlled track. In an area with single track 40 and sidings 42 and 43, it is advantageous to choose a single-track segment 45, rather than choosing a siding as the boundary element. In this case, trains must be sequenced through the boundary element 45. A LCA will determine the sequence in which trains will pass through the boundary element 45. LPA 1 and LPA 2 will insert a conditional stop for the train at the last safe location in the schedule to assure that the movements through the boundary element 45 are executed in the proper sequence. The conditional stop will enforce the order of trains moving through the boundary element 45 by holding a train at a safe place, for example at a siding 42, until the train that precedes it has completed its move.

Figure 5:
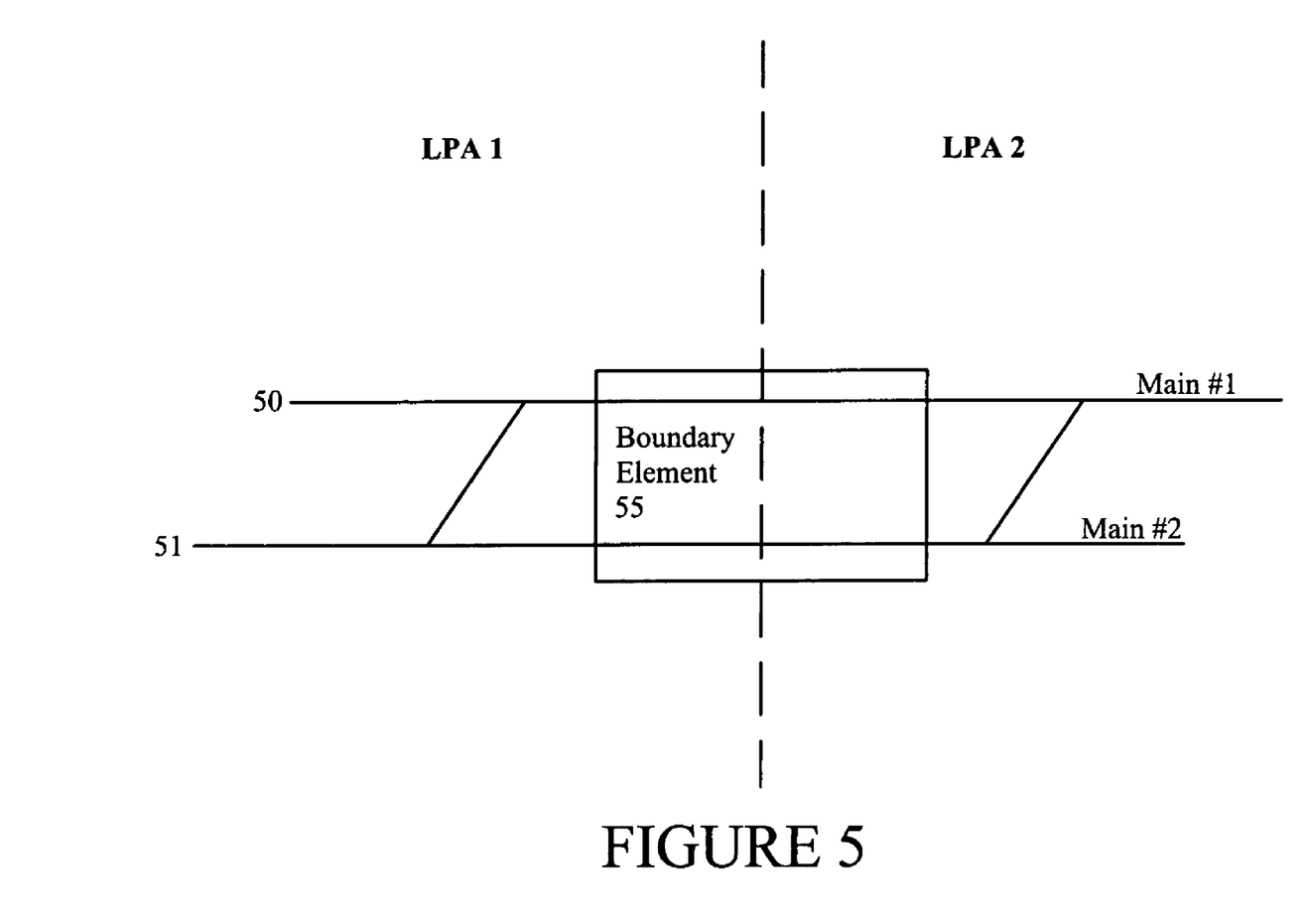
FIG. 5 is a simplified pictorial representation of a boundary element in accordance with yet another embodiment of the present invention.

FIG. 5 illustrates an example of the application of another embodiment of the invention in which the boundary element 55 is controlled multiple track 50 and 51. The process functions in the same manner as discussed above. In this case the supplying LPA determines the track that the train will use to cross the boundary and the LCA determines the sequence of trains over each track segment. LPAs insert a conditional stop to enforce the appropriate ordering of train movement through the boundary element 55.

One effective means of managing the flow between planning areas is to restrict the separation time between trains. For example, one might restrict the boundary element to space trains at least 10 minutes apart. This can be accomplished by the LCA setting the boundary queue capacity to 1 and the processing time to ten minutes.

In operation, one embodiment of the present application provides a daily schedule for the entire rail network identifying the trains, selected waypoints and activity locations and corresponding times of passage, arrival and/or departure from the designated locations of interest. Alternatively, trains may be introduced incrementally into the network at or prior to their origination. Based upon the identified plurality of LPAs, the train schedules are partitioned according to the extent of the LPAs and the appropriate portions of the schedule passed to the LPAs prior to entry of the train into the planning area.

Estimated time of arrival (ETA) of a train at waypoints throughout its journey are based upon the daily schedule provided. LPAs will refer to the daily schedule for anticipating the lineup of trains from adjacent LPAs. A daily schedule typically includes an origin point, a destination point, work locations, and other waypoints that must be visited by the train. This is expanded in the embodiment to include a detailed route identifying every track segment and switch over which the train will pass and is initially populated with ETA's from the network planning function and extrapolations of the schedule based upon train performance calculations. Subsequent updates to ETA's are made by the LPA in whose area a train is currently being tracked and propagated to remaining elements of a schedule.

Each LPA resolves any movement conflicts within the local planning area and within the planning horizon based on the initial input of the schedule to provide a LMP. Each LPA operates independently of all other LPAs and asynchronously of the other LPAs. Each LPA will take a different amount of time to generate its LMP and each LMP is submitted to a LCA each time it is completed without regard to the time of completion of other LMPs. Staggering of the operation of the LPAs is beneficial in that the LPA share access to common resources, i.e., databases, and the staggering reduces the likelihood of the LPAs trying to gain access to the common resources at the same time.

Each LPA may generate a LMP periodically, e.g. hourly "generation cycles", and passes the portion of the movement plan relating to the boundary elements to a LCA. The LPA may have a planning horizon which is configurable typically is as long as a typical crew shift, i.e., eight hours. The LCA compares the LMPs from adjacent planning areas sharing a common boundary element and resolves any conflict with the use of the boundary element. The LCA will determine the movement order constraints for the boundary element, i.e., the order of the trains and the ranges of times of arrival and departure for the trains through the boundary element. The boundary element constraints are passed to the applicable LPAs to update their respective LMPs consistent with the boundary element constraints at the next regularly scheduled update of the LMP. This update cycle normally occurs at frequent intervals (e.g. 4 minute intervals). While the LPAs control the movement of the trains within its local planning area, the order of trains over the boundary element is set by the LCA and may not be independently changed by a LPA.

Each LPA may include a local schedule repairer process, such as that generally described in commonly assigned U.S. Pat. No. 5,623,413 which is incorporated by reference herein, that updates the LMP based upon periodic train state update information. The revised ETA's at the boundary element from the revised LMP are typically passed to the LCA and forwarded to the neighboring LPA but the LCA does not revisit the sequence of the trains until the periodic generation cycle (hourly). The data relating only to the boundary elements is sent to the LCA after each periodic generation of the LMP, independently of the sending of LMPs from any other LPAs to the LCA. For example, the respective LMPs for a specific train traveling through adjacent planning areas may have disagreement at a boundary element hours in advance of the train's arrival. As a train approaches the boundary element the discrepancies between the LMPs decline in magnitude as the estimates of arrival time at the boundary become more accurate. Sometime prior to the arrival of a train at the boundary, the discrepancies between the LMPs have reduced sufficiently and the plan is frozen and LPAs and LCAs will make no further change in the plan.

The LPA generates a LMP in two steps, 1) the generation of a complete new LMP by the scheduler process and 2) the refinement of the LMP by the schedule repair process. The scheduler and scheduler process may be of the type generally described for example in commonly assigned U.S. Pat. No. 5,623,413 which is incorporated by reference herein.

The scheduler process provides a high-level movement plan for a planning area. Boundary coordination in the scheduler process will be obtained from the LCA as described above. These constraints include the time that entering trains will appear at a boundary element and the track availability at a boundary element that has been reserved by the LCA for the adjacent LPA. The output of the scheduler process in the LPA is referred to as a "coarse schedule". It is intended to provide an approximate solution that is refined into a feasible solution in a schedule repair phase.

The schedule repair process removes any remaining constraint violations based upon the position of the trains at the time that the LMP is refined. A coarse schedule defines all track segments that a train passes over. Schedule repair in the LPA may, if an alternate track has been made available by the LCA and the track element has not been frozen, choose to use an alternate track rather than the element specified in the coarse schedule. The LCA will indirectly influence the selection of track assignment by the allocation of track to an adjacent planning area. The boundary element may require coordination with a yardmaster, a dispatcher from another railroad, or the LPA from an adjacent planning area. In the normal condition, however, no coordination with a human is required.

The schedule repair of a LMP at a boundary element requires conformance to the latest LMP as modified by the LCA. The schedule repair process will seek a repair of the LMP that provides minimum deviation from the current LMP.

The schedule repair process will honor the ordering of trains through a boundary element. For each boundary element, the LCA for the boundary element will prepare a schedule for usage of the boundary element based upon the LMPs generated by the adjacent LPAs. This schedule will be a time ordered schedule of resource usage. During the schedule repair process, the LPA will honor the track assignment and train order specified in the LMP.

For example, if a Train B is planned to move through the boundary element at 1:30 on Main #2 track and a Train A is planned to move through the boundary element over Main#2 track at 1:15, the schedule repair may not move either train to Main#1 track and Train B must follow Train A in using Main#2 track. If Train A is delayed and is not able to move through the boundary element until 1:35, Train B must be delayed until after 1:35. At the "last safe place" before entering a boundary element, schedule repair process will insert a special "Conditional Stop" that will hold a train from entering a boundary element until the preceding train has cleared the boundary element.

In the event that an unexpected event makes it necessary for schedule repair process to change the ordering through the boundary element, the LPA will cause the appropriate LCA to alter the ordering of the trains. For example, a LMP as confirmed by a LCA established an order for trains to pass through a boundary element. The ordering provided for Train A to proceed eastbound. After Train A cleared the boundary element, Train C could proceed westbound. Once Train C had cleared the boundary element, Train B would proceed eastbound. If an anomalous event, requiring a re-ordering of trains, occurs just prior to a boundary element, the schedule repair process will generate and post a repaired plan and request a replan by the LCA. The LCA will reconsider the boundary element scheduling and compute a new ordering for the trains. The automatic issuance of authorities for the trains involved is discontinued until a new plan is posted, resolving the conflicting sequence request. In the example, the new sequence may be determined to be Train B-Train C-Train A. The new sequence is then posted for use by the LPAs to update their respective LMP's and the automatic issuance of authorities resumes.

In the case of hand-off to an adjacent LPA, the hand-off occurs automatically. A hand-off in this situation requires detailed coordination between the adjacent LPAs. The appropriate track and sequence of movements over the track will be determined by the LCA and will be followed by the local schedule repairer in each LPA.

Figure 6:
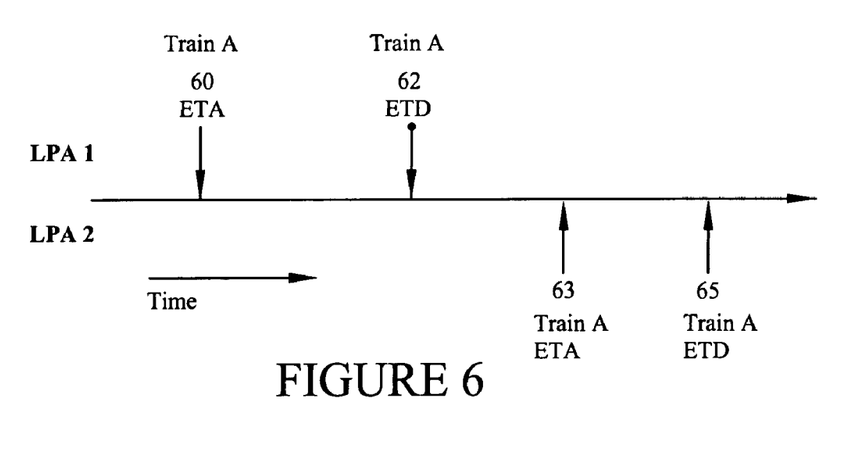
FIG. 6 is a simplified timeline illustrating the scheduled usage of a boundary element in accordance with one embodiment of the present invention.

FIG. 6 illustrates one aspect of the coordination of the LCA and the LPAs for a train traveling from Planner 1's (LPA1's) territory to Planner 2's (LPA2's) territory. In FIG. 6, LPA 1 schedules the train (e.g., Train A) to move the train into the boundary element at 60 and depart the boundary element at 62. LPA 2 schedules the same train to move the train into the boundary element at 65 and depart the boundary element at 67. Thus LPA 1 plans to move Train A into the boundary element at 60, ahead of the plan developed by LPA 2 at 65. In this case, the LCA will compute the boundary element dwell time based upon the time that LPA 1 moves the train into the queue at 60 and the time that LPA 2 plans for Train A to depart from the boundary element at time 65. Because the dwell time in the boundary element computed by LCA is greater than usage time of the boundary element required by the train, the LCA can pass an earlier departure time to LPA2.

Figure 7:
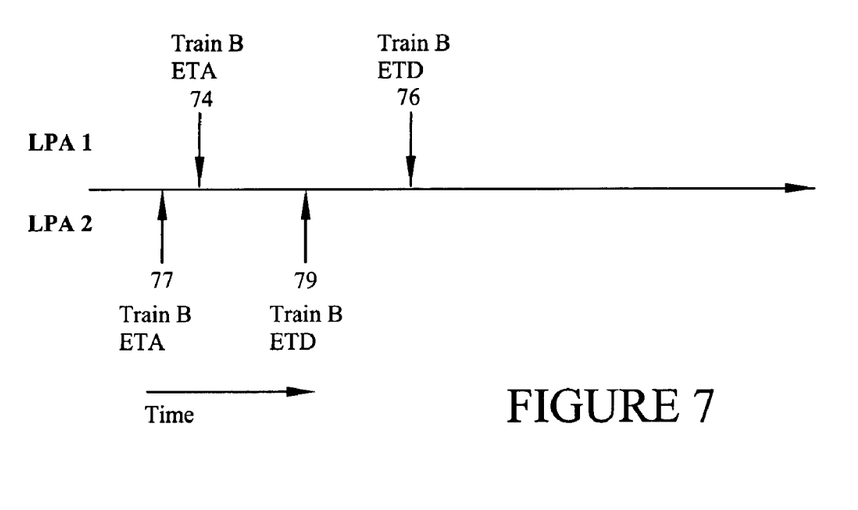
FIG. 7 is a simplified timeline illustrating the scheduled usage of a boundary element in accordance with one embodiment of the present invention.

FIG. 7, illustrates another aspect of the coordination of the LCA with the LPAs for a train (e.g., Train B) traveling from planning area 1 to planning area 2. LPA 1 schedules Train B to move the train into the boundary element at 74 and depart the boundary element at 76. LPA 2 schedules Train B to move the train into the boundary element at 77 and depart the boundary element at 79. Thus LPA 1 plans to move Train B into the boundary element at 74 behind the plan developed by LPA 2 at 77. In this case, the boundary element dwell time constraint is violated. This situation occurs when LPA 1 changes the ETA of Train B because of an unexpected delay from the time previously provided to LPA 2. For these cases, LPA 1 does not move Train B into the boundary element early enough to complete its work before LPA 2 has scheduled Train B to depart. The LCA will recognize this as a conflict in the train's movement plan. The coordinating agent will pass the new ETA from LPA 1 to LPA 2 and adjust the ETD appropriately in order to identify any other conflicts induced by the change.

ETA's between updates will vary because of changes in the LMP developed by a LPA. As a train approaches a boundary point, the forecasted ETA will become more accurate and the ETA's used by each LPA will converge. In addition the plan will be frozen as the trains near the boundary element to preclude last minute changes to the plan. Additional conflicts in usage may occur because a LPA holds a train in the boundary element. For example, a LPA may plan to hold train in a boundary element for an additional thirty minutes in order to improve the flow in its local planning area. This hold will preclude the adjacent LPA from forwarding another train into the boundary element. This affect will slow the transfer of traffic toward the boundary point.

Overbooking of a boundary element (exceeding the capacity of the boundary element) may occur because of the asynchronous and independent nature of the LPAs. The cognizant LCA will examine the LMPs from the respective LPAs and remove the overbooking by delaying the planned arrival of selected trains. The LCA will utilize the business objective function associated with each train to incur the least impact to the value of the objective function.

Figure 8:
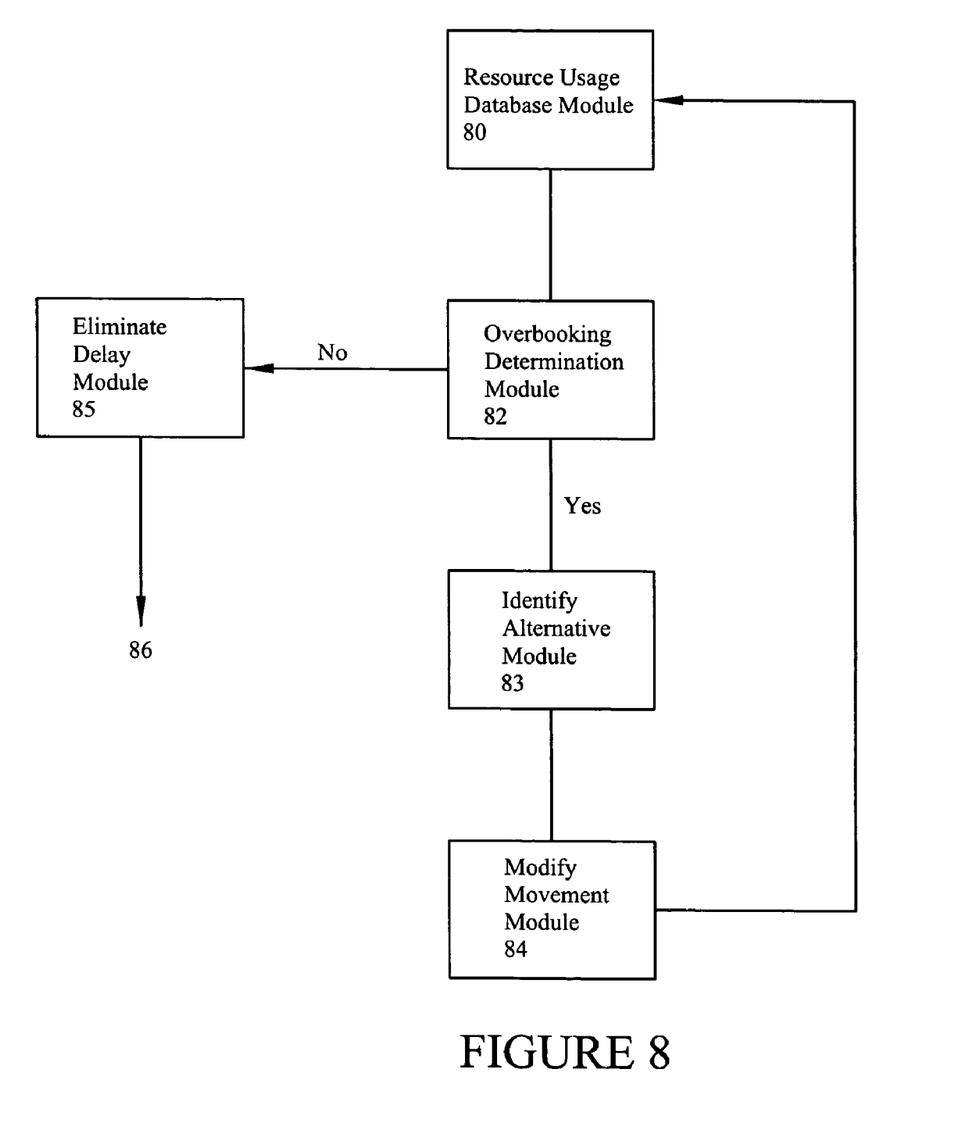
FIG. 8 is a simplified functional block diagram of one embodiment of a conflict resolution module for use with the embodiment of FIG. 2.

With respect to FIG. 8, in operation, the LCA may first build a resource usage data structure at resource usage database module 80 based upon the resolved arrival and departure times for the trains in the LMP as described above. Unanticipated events may cause random delays in arrival times. In order to minimize the impact of such variations, a LCA will include cushion in the planned usage of the boundary queue. The cushion will be a function of the "time to arrival" for the train. For example, a train scheduled to arrive in one hour might have a 5-minute cushion in its arrival time, whereas a train scheduled to arrive in two hours might have a 10-minute cushion. The amount of cushion provided is a user configurable parameter. This cushion reduces the wasted capacity that may occur because of random variations from the movement plan.

The LCA will next scan through the usage data to identify the earliest overbooking interval at overbooking detection module at 82. Once the earliest overbooking interval is identified, the LCA identifies those trains that are involved in the overbooking and selects a train to delay in order to reduce the overbooking in overbooking elimination module 83. The selection is made based upon the business objective function associated with each candidate train. The selected train is delayed at modify movement module 84 and the LCA then repeats the loop to identify and remove any remaining overbooking. When all overbooking is eliminated a final sweep is performed to eliminate any unnecessary delay introduced by the LCA at eliminate delay module 85 and the results are sent to the respective LPAs at 86.

In the event of the detection by the LCA of an unacceptable conflict between the LMPs at any boundary element, the conflict is passed to a human dispatcher for resolution. The LCA provides each LPA with revised constraints for each boundary element without any regard to conflicts which may have been previously resolved by the LPA, or which may be generated within any local planning area due to the revised constraints.

Each of the LPAs revises its LMP consistent with the updated data on the train's (a) location and state and (b) the revised boundary element constraints from the LCA, and provides a revised LMP to the LCA periodically. The LCA compares the received LMPs currently available to it without regard to when such plans were received, and repeats the process of revising the boundary constraints.

The LMPs are implemented with the assistance of human dispatchers. The network of track is divided into a plurality of dispatch areas where a human dispatcher is normally responsible for the traffic through his dispatch area. A dispatch area typically does not correspond to the local planning areas and generally a local planning area encompasses several dispatch areas. Thus a dispatch area uses only a portion of the LMP corresponding to that dispatch area. The LMPs are automatically implemented in coded track coverage ("CTC") territory, switches are positioned automatically, signals cleared in advance of the train, and the assistance of a dispatcher is required only when a conflict can not be resolved by the LPA/LCA. The dispatcher generally has more information at his disposal than the LPA/LCA and thus the dispatcher is able to resolve a conflict using information not available to the LPA/LCA. As such, the movement plan provided to the dispatcher allows the dispatcher to evaluate the inputs and make adjustments where necessary. In track warrant control (TWC) territory a dispatcher is notified when a track warrant should be issued based upon the LMP. Dispatcher issuance of a track warrant following the proper procedures is required.

This arrangement allows the dispatcher to "dispatch by exception" in CTC territory, requiring the dispatcher to take action only when the LCA identifies a conflict that can not be resolved by the LCA. The system described above presents a unique interface and software applications to assist the dispatcher to fulfilling his duties. For example, a task list is generated which identifies actions requiring the dispatcher's attention. Other applications assist the dispatcher in establishing communications with the trains in his dispatch area and allowing the modification of waypoints and activity locations. The above functions of the LPA and the LCA can be implemented using computer-usable medium having a computer readable code executed by special purpose or general purpose computers.

While preferred embodiments of the present invention have been described, it is understood that the embodiments described are illustrative only and the scope of the invention is to be defined solely by the appended claims when accorded a full range of equivalence, many variations and modifications naturally occurring to those of skill in the art from a perusal hereof.

What is claimed:

1. A method of controlling the movement of plural trains along a network of track, comprising:
    (a) dividing the network into plural planning areas, with each planning area of a pair of adjacent planning areas sharing at least one common boundary element on track common to the adjacent planning area;
    (b) developing a local movement plan for each planning area independently of the movement plan for other planning areas to control the movement of trains into and out of the common boundary element associated with the planning area; and
    (c) evaluating the local movement plans for adjacent planning areas to identify conflicts at the respective boundary element,
    wherein said dividing the network into planning areas includes dividing the network as a function of the amount of proposed traffic for the track of each planning area.

2. A method of controlling the movement of plural trains along a network of track, comprising:
    (a) dividing the network into plural planning areas, with each planning area of a pair of adjacent planning areas sharing at least one common boundary element on track common to said adjacent planning area;
    (b) developing a local movement plan for each planning area independently of the movement plan for other planning areas to control the movement of trains into and out of the common boundary element associated with the planning area; and
    (c) evaluating the local movement plans for adjacent planning areas to identify conflicts at the respective boundary element,
    wherein a planning time horizon of each local movement plan is approximately eight hours.

3. The method of claim 2 wherein each local movement plan is updated approximately hourly.

4. A method of scheduling the movement of plural trains along a network of track, comprising:
    (a) dividing up the network into a plurality of planning areas separated by boundary elements, with each boundary elements comprising a portion of the network of track which is common to respective planning areas;
    (b) generating a movement plan for each planning area independently of other planning areas to control the movement of trains into and out of the boundary elements; and
    (c) evaluating each of the movement plans and identifying scheduling conflicts at respective boundary elements, wherein said evaluating each of the movement plans includes:
    (d) assigning a business objective function for each of the trains in the planning area;

(e) evaluating the business objective functions for each of the trains; and
(f) identifying a capacity of the boundary element, constraints on occupancy times and the planned usage of the specified boundary element from each of the planning areas.

5. The method of claim 4 wherein said modifying the movement plan includes:
(g) providing movement order constraints for each boundary element; and
(h) providing an order for the trains to move through the boundary element.

6. A method of providing a detailed train movement plan for controlling the travel of plural trains of plural components along an interconnected network of tracks across a global planning area comprising:
(a) dividing the global planning area into plural local planning areas each including a portion of the network of tracks, the boundaries of adjacent local planning areas being crossed at points of network transition having common boundary elements;
(b) providing a daily schedule for all trains transiting the network, the daily schedule providing waypoints and activity locations and time of arrival and departure at, each of the waypoint and activity locations;
(c) providing a local movement plan ("LMP") for each of the plural local movement areas revising the times of arrival and departure at the waypoints and activity locations to attempt to resolve all of the conflicts as to the usage of the portion of the network and train components within a local area independently of the resolution of any such conflicts in any other local area;
(d) comparing the LMPs having common boundary elements and resolving any conflicts in the common boundary elements by revising the LMPs.

7. The method of claim 6 further including:
(i) independently monitoring the actual movement of train components over the network within each of the local planning areas; and
(ii) periodically updating each of the LMPs as a function of the monitored movement of train components.

8. The method of claim 7 further comprising:
(i) comparing the updated LMP from each of the local areas with common boundary elements:
(1) periodically; and/or
(2) each time the LMP is updated.

9. The method of claim 6 wherein said dividing comprises dividing the global planning area into plural local planning areas as a function of the amount of track included within the local area and the amount of proposed traffic for such included track.

10. The method of claim 6 wherein said comparing the LMPs includes the step of identifying a conflict which can not be resolved.

11. A method of scheduling the movement of plural trains along a network of track, wherein the network is divided into a plurality of planning areas, comprising:
(a) selecting the size of each planning area as a function of the amount of track and amount of proposed train traffic along the track in the planning area; and
(b) selecting the boundaries as a function of the portions of the network of track which is common to adjacent planning areas.

12. The method of claim 11 wherein said developing a movement plan is performed independently for each planning area.

13. The method of claim 11, further comprising:
(c) developing a movement plan for each planning area.

* * * * *